United States Patent [19]

Sanders

[11] 4,016,941
[45] Apr. 12, 1977

[54] HAND-SIZE FLUID-POWERED TOOL RECIPROCATOR

[76] Inventor: William H. Sanders, 3442 Kenwood Blvd., Toledo, Ohio 43606

[22] Filed: Aug. 11, 1975

[21] Appl. No.: 603,787

Related U.S. Application Data

[63] Continuation-in-part of Ser. No. 339,122, March 8, 1973, abandoned.

[52] U.S. Cl. ................................. 173/170; 91/277; 91/309; 91/335; 279/1 K; 279/76; 403/322
[51] Int. Cl.² ........................................ B24B 23/00
[58] Field of Search .................. 173/115, 126, 170; 91/304, 277, 41, 335; 279/76, 1 K, 9; 29/764; 403/322, 321, 1; 30/392

[56] References Cited

UNITED STATES PATENTS

| 1,804,216 | 5/1931 | Gustafson | 91/335 |
| 1,965,064 | 5/1934 | Zwayer | 91/277 |
| 2,224,132 | 12/1940 | Barnes | 91/335 |
| 2,668,518 | 2/1954 | White | 173/115 |
| 3,351,364 | 11/1967 | Warn et al. | 403/1 |
| 3,720,137 | 3/1973 | Landherr | 91/304 |

Primary Examiner—Ernest R. Purser
Assistant Examiner—William F. Pate, III

[57] ABSTRACT

A portable and high-speed tool reciprocator for small tools, such as files, cutters, burnishing and polishing stones, leathers and the like, of a size easily held in one hand of an operator; fluid driven, preferably by a pneumatic fluid, the length of the reciprocatory stroke of which reciprocator may be adjusted, while in operative reciprocation, without the reorganization of its parts or the employment of extraneous gear, and the reciprocated tool may be selectively controlled to be either free or locked against rotation about its axis of reciprocation, while in operative reciprocation, without the reorganization of the reciprocator parts or the employment of extraneous gear, thus to enable the tool and its working face to move angularly relative to its axis of reciprocation and the holder, when free floating, or, when locked, to dispose the tool and its working face at some desired angle to tool reciprocation and the holder.

18 Claims, 26 Drawing Figures

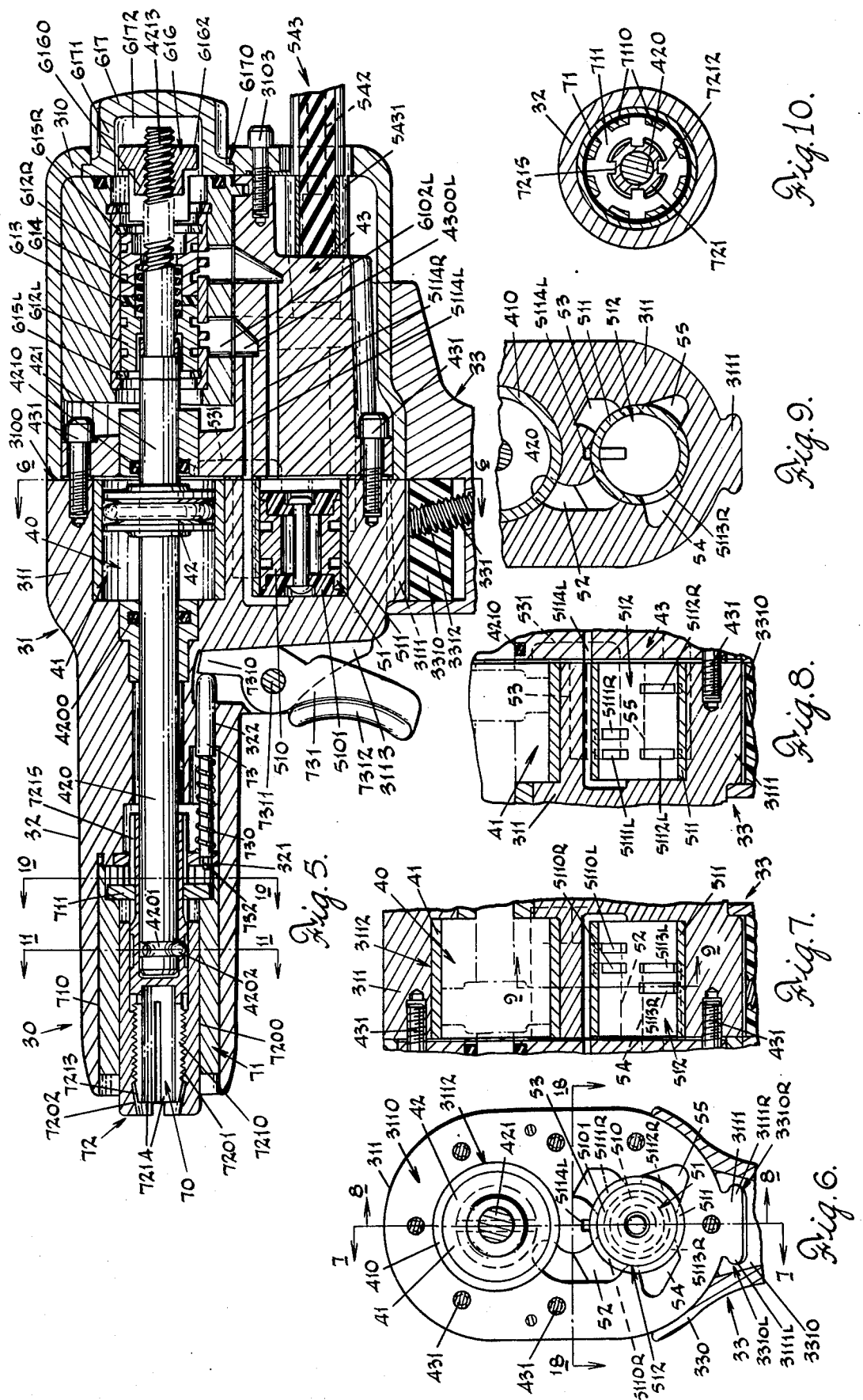

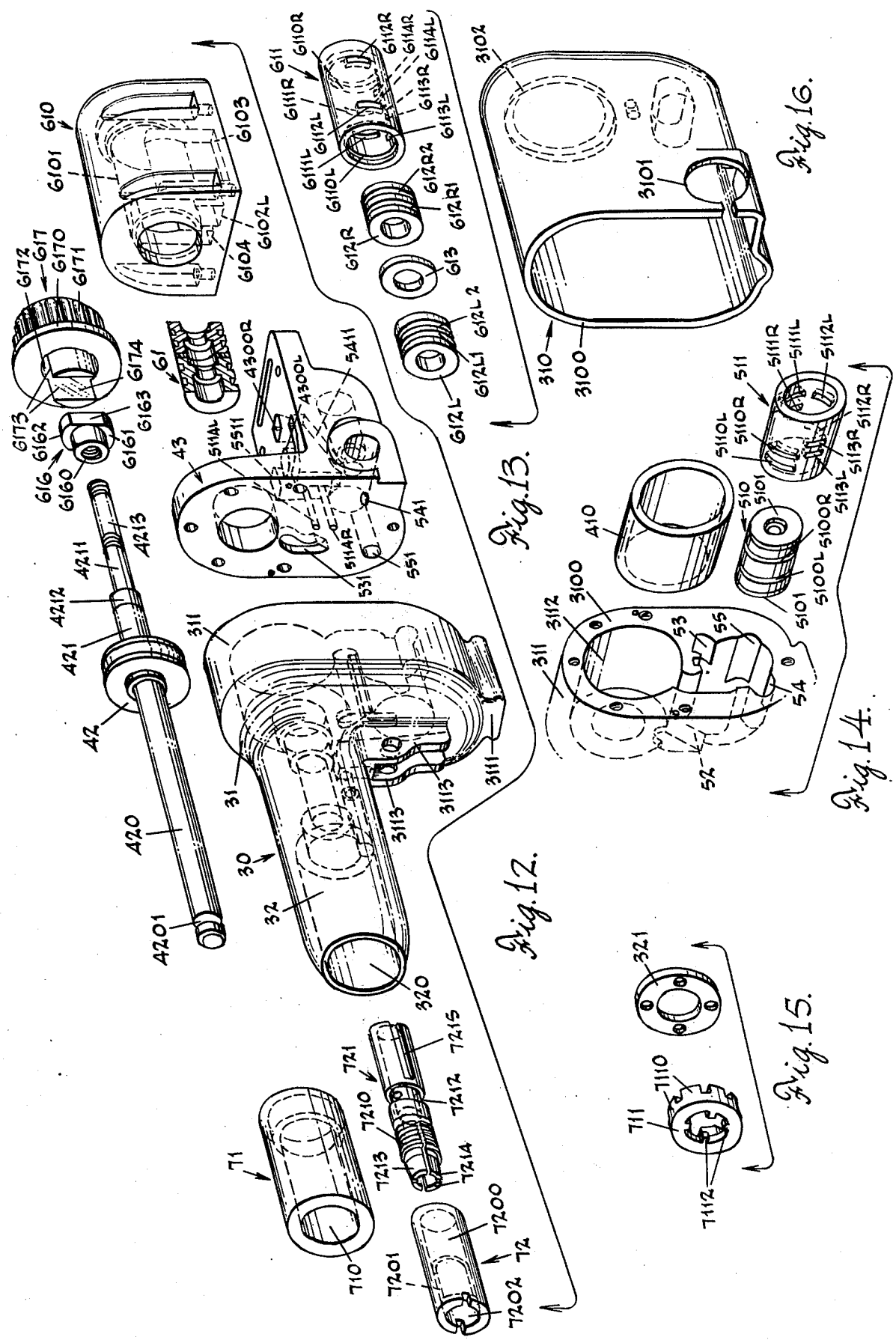

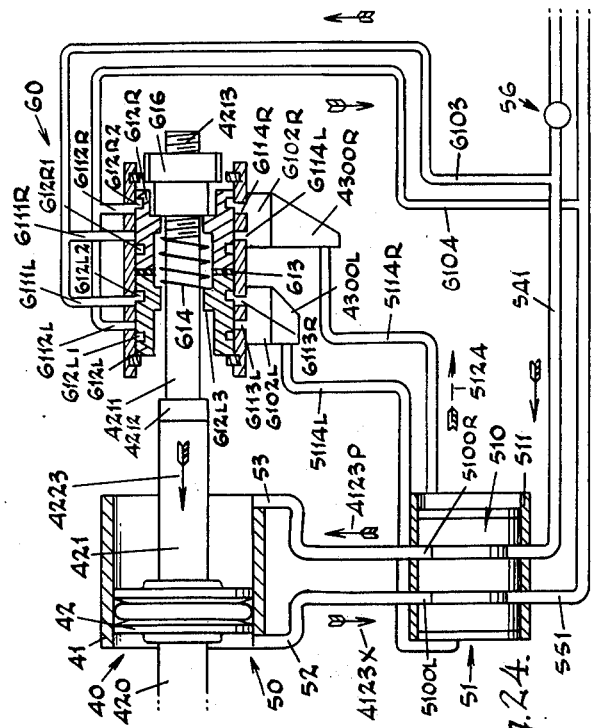
Fig. 24.
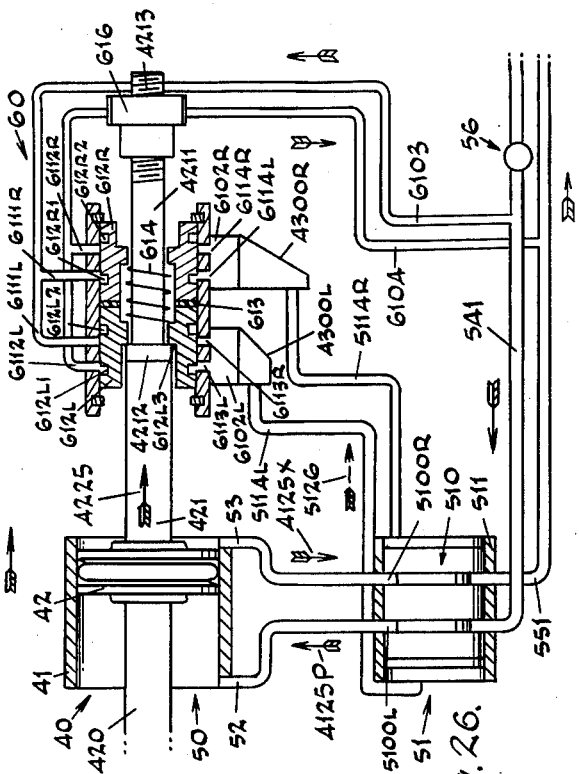
Fig. 26.
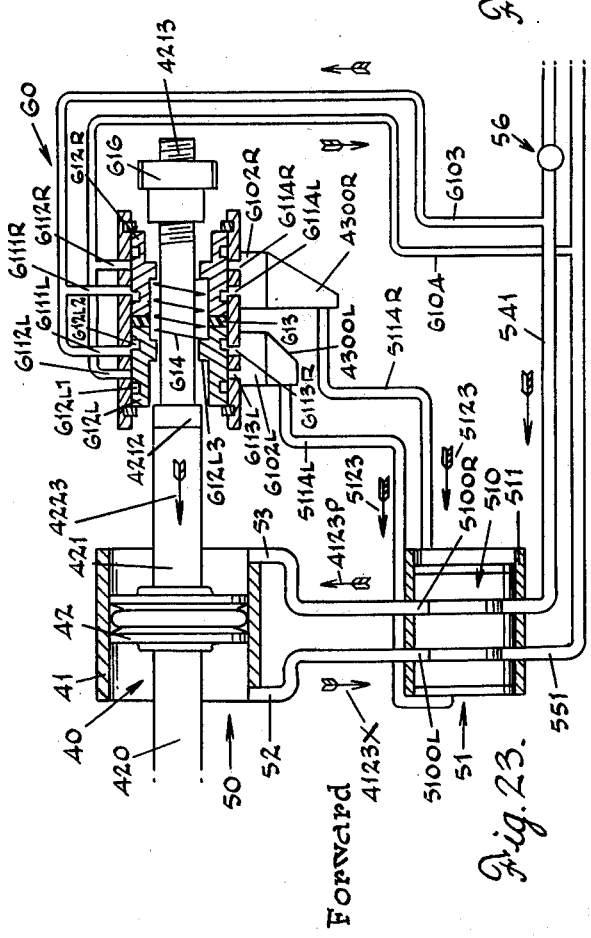
Forward  Fig. 23.
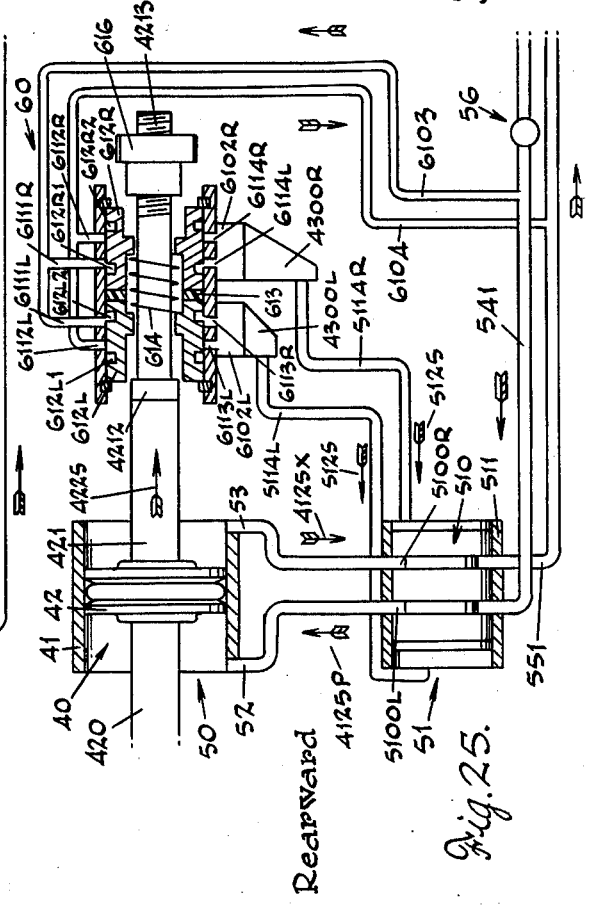
Rearward  Fig. 25.

HAND-SIZE FLUID-POWERED TOOL RECIPROCATOR

This Application is a "Continuation" or a "Continuation-in-Part" of co-pending Application Ser. No. 339,122 filed Mar. 8, 1973 now abandoned.

BACKGROUND OF THE INVENTION

1. Field of the Invention

Profiling tools, die finishing equipment such as that which reciprocates files, stones and leathers over and against hard (metal) surfaces to produce patterned or desired conformance thereof within close tolerances.

2. Description of The Prior Art

Hand holdable, powered tool reciprocators are not unknown to the prior art. These include structures such as those shown in U.S. Pats. Nos. 1,804,216 to GUSTAFSON, 2,224,132 to BARNES, 2,668,518 to WHITE, 2,933,800 to FRIDEN and 3,465,601 to WEZEL. Motion control systems, valving therefor and subordinate equipment, some from other than the tool reciprocating arts, of possible adaptability thereto, are shown in U.S. Pat. Nos. 1,965,064 to ZWAYER, 3,351,364 to WARN et al., and 3,720,137 to LANDHERR.

Most commonly, however, the power applied in certain of these structures is that developed by an electric or pneumatic-driven rotary motor, either within the holder itself, as suggested by WEZEL, or at some remote point, as in FRIDEN, where the motor torque is communicated to the holder and tool through a flexible cable. In both type equipments, if the tool is to be reciprocated, it is necessary to provide space in the holder and accept the increased mass thereof for motion converter elements by which the rotary-driving movement is changed to a lineal reciprocatory movement.

Those of the prior art structures which are designed for pressured fluid operation, such as GUSTAFSON, BARNES or WHITE, or which teach the provision of motion control, valving or other subordinate equipments, such as ZWAYER, WARN et al., or LANDHERR, do not lend themselves to the desirable practicalities of fine tool and die finishing operations. These include abilities to produce something like 8,000 to 12,500 strokes per minute at an acceptable vibration or less than 90 decibels with a device weighing barely over one pound, namely 17 ½ ounces, having a displacement of less than 48 cubic inches (equal to that of a conventional hand-gun) capable of controlled (while in operation) variation of stroke length from 1/16 inch to ⅜ inch and of variation in tool orientation to the work about the tool axis and throughout a full 365° degrees. These requirements are, however, met in embodiments of my invention hereinafter to be described.

SUMMARY OF INVENTION

The invention relates to the provision, in a tool reciprocator, of a tool-moving reciprocatory motor, fluid driven, preferably by air under pressure, having a plurality of means, one of which conveys the spent driving fluid to a discharge point remote from the work; another of which is operable, while the motor is in reciprocation, to change the length of the motor reciprocatory stroke; another of which is operable, while the motor is in reciprocation, to change the speed of the motor stroke and another of which is operable, while the motor is in reciprocation, to change the nature of permitted movement of the tool relative to its central longitudinal axis from freely floating to a fixed angle thereto - without the employment of extraneous parts or the reorganization of the parts already in use.

As a consequence in the foregoing, the invention relates to a compact, lightweight, easily manipulated tool reciprocator of simple but durable construction, easily assembly, quickly repaired and of low cost and in which the spent driving fluid, if it be pneumatic, is diverted from producing an occupationally undesirable atmospheric suspension of the work detritus in the vicinity of the reciprocator and its operator.

BRIEF DESCRIPTION OF THE DRAWINGS

In the accompanying drawings:

FIG. 5 illustrates a view of a vertical section taken along the plane of the line 5—5 indicated in FIG. 2;

FIG. 6 is a view of a vertical section taken along the plane of the line 6—6 indicated in FIG. 5;

FIG. 7 is a view of a vertical section taken on the plane of the line 7—7 indicated in FIG. 6;

FIG. 8 is a view of a broken vertical section taken on the plane of the line 8—8 indicated in FIG. 6;

FIG. 9 is a view of a vertical transverse section taken on the plane of the line 9—9 indicated in FIG. 7;

FIG. 10 is a view of a vertical transverse section taken along the plane of line 10—10 indicated in FIG. 5;

FIG. 12 is an exploded perspective view of component parts of the reciprocator shown in FIG. 1;

FIG. 13 illustrates an exploded perspective of component parts of pilot valves within the overview of the showing made in FIG. 12;

FIG. 14 is an exploded perspective view of component parts, within and at an angle of approximately ninety degrees to the overview showing made in FIG. 12, of a shifter valve responsive to the pilot valves shown in FIG. 13;

FIG. 15 is a similar exploded view in perspective of component parts, within the overview of the showing made in FIG. 12, of means whereby tool rotation may be controlled;

FIG. 16 is a perspective view of an outer case within which many of the component parts shown in FIG. 12 are housed;

FIG. 23 is a diagrammatic, showing parts and circuits diagrammatically, in positions prevailing when the reciprocator of FIG. 1 is moving a tool "forward" or to the left, when viewing FIG. 1 of the drawings;

FIG. 24 is a diagrammatic, showing the parts and circuits again diagrammatically, in positions prevailing when the motion portrayed as taking place in FIG. 23 has been completed and the tool is about to be moved "rearward" or to the right, when viewing FIG. 1 of the accompanying drawings, FIG. 25 is also a diagrammatic, showing the parts and circuits in positions prevailing when the motion initiated as a consequence of the action portrayed as taking place in FIG. 24 is in course; and FIG. 26 is a further diagrammatic, showing the parts and circuits in positions prevailing when the motion portrayed in FIG. 25 has been completed and the tool is about again to be moved "forward" into the stroke phase portrayed in FIG. 23.

DESCRIPTION OF THE PREFERRED EMBODIMENT

Figure 2:
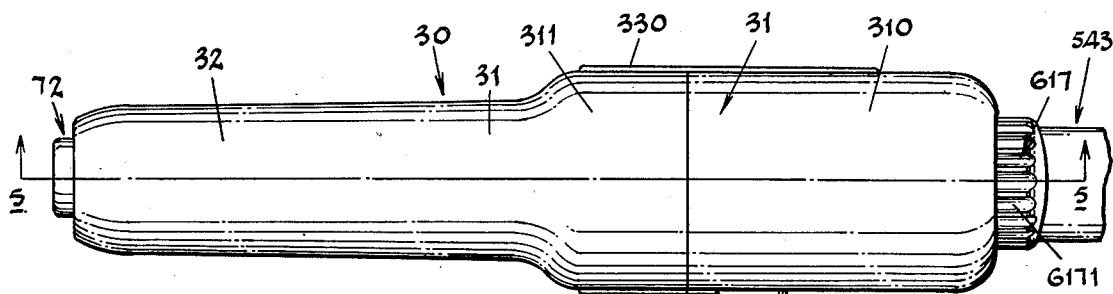
FIG. 2 is a top view of the reciprocator shown in FIG. 1.

A hand-size fluid-powered tool reciprocator embodying the features of my invention has an enclosing housing 30, a pressure fluid responsive motor 40 within the housing 30, circuitry 50, for delivering fluid under pressure to the motor 40 and for carrying the spent fluid away from the work site, pilot circuitry 60 within the housing 30, responsive to fluid pressure, in operative connection with circuitry 50 and adapted to activate the same essentially in accordance with the movement of the motor 40 and a tool engaging means 70 to operatively connect a tool (file, cutter, burnishing or polishing stone, leather or the like) to the motor and thus to be thereby activated. The means by the which the length of the reciprocatory stroke produced by the motor 40 is adjusted include elements in the pilot circuitry 60 that cooperate with elements of the motor 40. The means by which the velocity of motor reciprocation may be controlled include elements of circuitry 50. So also, the means by which a tool is rendered selectively rotatable about its axis and fixed against such rotation include elements of the housing 30 that cooperate with elements of the tool engaging means 70.

The Housing 30

Preferably, the housing 30 is of light-weight metal having walls defining interior chambers conformed to receive, in a snug fitting relation, certain component parts of the motor 40, the circuitries 50 and 60 and the tool engaging means 70. The housing has a main body portion 31 and an auxiliary protruding barrel or nose portion 32. The body portion 31 consists of two end mating parts 310 and 311. The part 310 is preferably a shell (see FIG. 16 of the accompanying drawings) whose end edge 3100 mates with surface 3110 on part 311, when the parts 310 and 311 are assembled, to be thus retained by a means hereinafter described.

Figure 1:
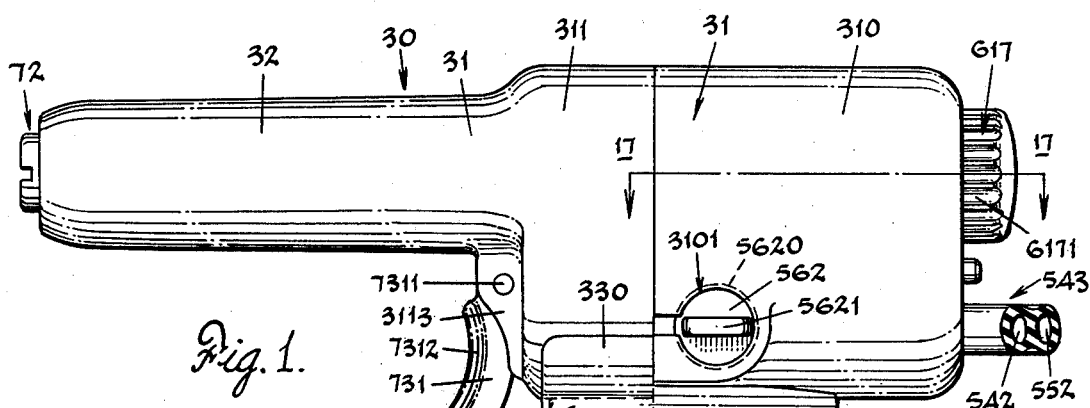
FIG. 1 illustrates a side view, in elevation, of a Hand-Size, Fluid-Powered Tool Reciprocator embodying the features of my invention.
Figure 3:
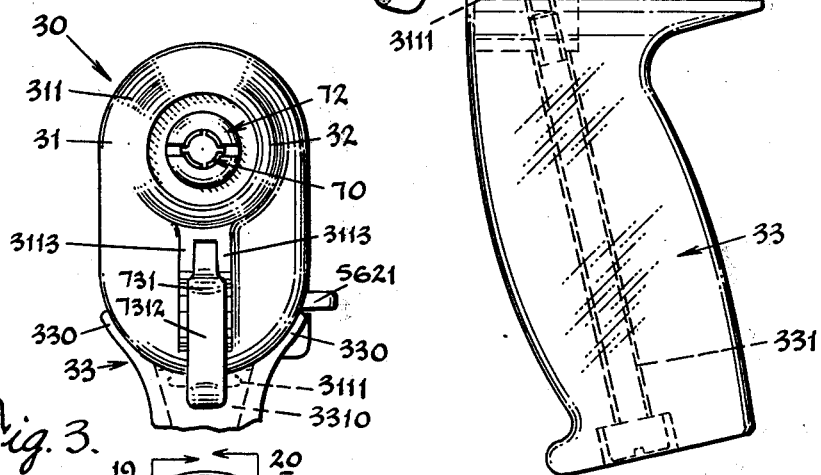
FIG. 3 is a front view of the reciprocator shown in FIG. 1.
Figure 4:
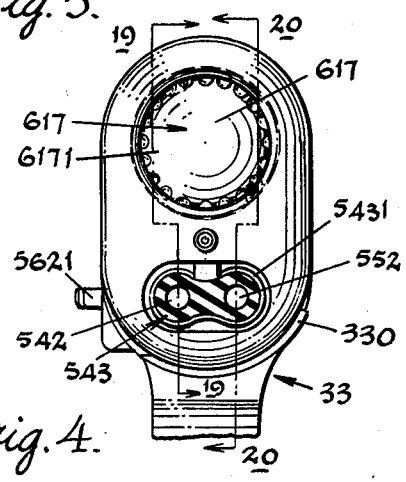
FIG. 4 is a rear view of the reciprocator shown in FIG. 1.

The body portion 31 will be seen (FIGS. 1, 2 and 3 of the accompanying drawings) to have, in its embodiment of the interengaging and assembled parts 310 and 311, an elongated exterior that, when viewed in cross section, is substantially of an elliptical form whose major axis extends vertically.

The body part 311 of the housing 30 preferably has a downward extending lug 3111 having ogee-shaped side surfaces 3111L and 3111R. The lug 3111 provides a connection by which a handle 33 may be removably attached and become a part of the housing 30. As illustrated (see accompanying drawings of FIGS. 1, 3, 5 and 6), the handle 33 may have opposite wing portions 330 that nest with and enclose the lower exterior surface of the assembled housing body parts 310 and 311. A suitable fixing means, such as a bolt 331 mounted in bearing relation within the handle, may be provided and be adapted to lock the handle 33 to the housing body portion 31. Such is contemplated, in the provision of a wedge-shaped block 3310 located in the open upper end of handle 33 between the wing portions 330 and having surfaces 3310L and 3310R, complimentary to side surfaces 3311L and 3311R of the lug 3111. The block 3310 has a tapped socket 3312 for threadably receiving the end of bolt 331. Now with the handle in mounting position and the block and lug surfaces in interfitting relation, the bolt 331, when turned into socket 3312, forces the block 3310 into a wedging relation to lock the handle on the body portion. Thus, it will be seen that the housing 30 may be adapted, at will, to have a handle or to be handleless, according to the exigencies at the work site.

The protruding barrel or nose portion 32 of the housing 30 is preferably formed integral with the body part 311 and extends axially from a point above the elliptical center of the body portion 31. Thus, as will be seen from FIG. 1 of the accompanying drawings, the reciprocator, to which the handle 33 is attached, has the appearance and manual adaptability of a hand-gun. Advantage is taken of such hand-gun form in the mounting of controls by which the tool movement and direction is varied. This will become apparent as the descriptions of such control means and operations proceed.

The barrel portion 32 serves to house the tool engaging means 70 operatively associated with the motor 40, which, in itself, is largely disposed in the body portion 31.

The Motor 40

The fluid-powered motor 40, best illustrated in FIGS. 5, 12 and 14 of the accompanying drawings, includes a cylinder 41 and piston 42. The cylinder 41 is formed by a sleeve 410 disposed in a cylindrical chamber 3112, within part 311 of the housing body portion 31. The piston 42 is preferably of the double-acting type having the usual sealing O-rings and opposite extending piston rods 420 and 421. The piston rod 420 extends through a bearing 4200 at one end of the cylindrical chamber 3112. The other piston rod 421 extends through a bearing 4210 in a manifold or header 43 affixed, as by bolts 431, to the part 311, thus to close one end of cylindrical chamber 3112 and complete the cylinder 41.

The piston rod 420 operatively engages the tool engaging means 70 to be described and the piston rod 421 actuates elements of the pilot circuitry 60 that directs activation of the motor driving circuitry 50.

The Motor Actuating Circuitry 50

Fluid under pressure, preferably a pneumatic fluid, is delivered, alternately to first one end and then to the other end of the cylinder 41, the spent fluid being carried away alternately through opposite cylinder ends. Such delivery and discharge is controlled by a shifter valve 51 of the motor driving circuitry 50. The shifter valve 51 and certain of the fluid circuits with which the valve collaborates are best shown in FIGS. 5 to 9 inclusive, and 14 and 18 of the accompanying drawings.

Such valve 51 has a spool valve member 510 slidably mounted for axial movement within a cylindrical sleeve 511 extending into an open-ended cylindrical chamber 512 (see FIGS. 5, 8 and 14 of the drawings) within the housing body part 311. The open end of the chamber 512 is closed by and when the aforementioned manifold 43 is affixed by the bolts 431 to the body part 311, as aforesaid. The sleeve 511 is of such axial dimension as to allow the valve member 510 to move axially in reciprocation and, in so doing, to open and close fluid conveying circuits between a fluid source and a sump and the cylinder 41 of the motor 40, thus to drive the motor piston 42. The axial movement of the valve member 510 is controlled by the pilot circuitry 60 in a manner to be later described.

The circuitry 50 between the motor cylinder 41 and shifter valve 51 will now be described. In this effort, particular attention is invited to the illustrations set forth in FIGS. 5 to 9 inclusive of the drawings. It will be seen (FIGS. 7 and 9) that one end (the left end as viewed in FIG. 5) of the motor cylinder 41 communicates through a passage 52, formed largely in the body part 311, with the chamber 512 of valve 51 and, through a pair of axially spaced openings 4110L and 5110R in the wall of sleeve 511, with the interior of the valve chamber 512. The other end of the motor cylinder 41 communicates (see FIGS. 6 and 8) through a passage 53, formed in the body part 311 and connecting to passage 531 in the manifold 43, with the valve chamber 512, and, through a second pair of axially-spaced openings 5111L and 5111R in the wall of sleeve 511, with the interior of the valve sleeve 511.

Figure 19:
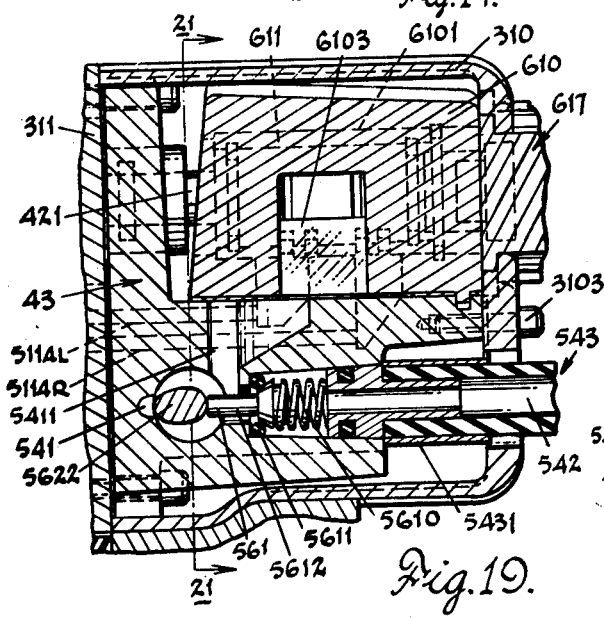
FIG. 19 is a view of a vertical longitudinal section taken on the plane of the line 19—19 indicated in FIG. 4.
Figure 20:
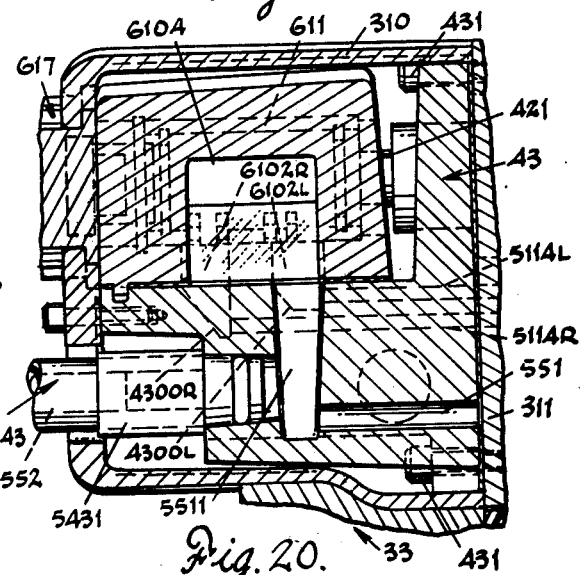
FIG. 20 is a view of a vertical section taken on the plane of the line 20—20 indicated in FIG. 4.

The interior of the valve sleeve 511 is also in communication with a source of fluid, preferably a pneumatic one under pressure, and with a remotely located sump or exhaust to receive or there discharge spent fluid. To that purpose, the sleeve 511 has two additional pairs of openings, 5112L and 5112R and 5113L and 5113R. The pair of openings 5112L and 5112R are axially spaced along the sleeve 511 and communicate by way of a passage 54 in the body part 311 and a thereto connecting passage 541 formed within the manifold 43 with passageway 542 in a dual passage extension flexible hose 543. The pair of openings 5113L and 5113R in valve sleeve 511 are also axially spaced along the sleeve 511 and communicate by way of a passage 55 in the body part 311 and a thereto connecting passage 551 formed within the manifold 43 with the second passageway 552 in hose 543. The passage 542 of hose 543 may be attached to some suitable source of fluid under pressure and the passageway 552 to some suitable sump or exhaust device. The hose 543 may be suitably secured in position, as shown in FIGS. 5 and 19, as by clamp 5431 attached within the housing 30, as will be later described. Such source, sump and exhaust, being well known in the art, are not herein further described nor are they shown in the drawings.

Thus, fluid under pressure may be conveyed to within the shifter valve sleeve 511 to be there directed alternately to opposite ends of the motor cylinder 41, as controlled by the movement and position of the shifter valve member 510 in the sleeve 511 with reference to the mentioned sleeve openings.

The spool valve member 510 has a pair of axially spaced circumferential grooves 5100L and 5100R in its lateral surface. Such spacing is related to the axial movement of the valve member 510 within the sleeve 511 and to the mentioned sleeve openings. The relation is such that groove 5100L, when the member 510 is at one extreme of its possible movement in the sleeve 511, registers with and effects communication between openings 5110L and 5112L and would thus enable fluid under pressure to enter one end of the motor cylinder 41 through passage 52. When the valve member 510 is in such position, the valve member groove 5100R will be in registry with and be effecting communication between sleeve openings 5111L and 5113L, thus connecting the other end of the motor cylinder 41 through passage 53 with sump or exhaust.

With such connections, the motor piston 42 will be caused to move away from the mentioned end of cylinder 41 toward the other end of the cylinder. The mentioned pilot circuitry 60, to be later described, is now activated to shift the valve member 510 to the opposite end of the sleeve 511. When the valve member 510 reaches the opposite end of the valve sleeve 511, valve member groove 5100R on the valve member 510 will register with and effect communication between sleeve openings 5111R and 5112R and valve member groove 5100L will register with and effect communication between sleeve openings 5110R and 5112R.

Now, since fluid under pressure will be delivered to the other end of the motor cylinder 41 by such connections, the motor piston 42 will be caused to move in the opposite direction from that first described. Thus, by alternately shifting the valve member 510 from one to the other extremes of its potential stroke in the valve sleeve 511, the motor 40 may be caused to reciprocate, as is shown diagrammatically in the sequence of FIGS. 23 to 26, inclusive, of the accompanying drawings.

Figure 21:
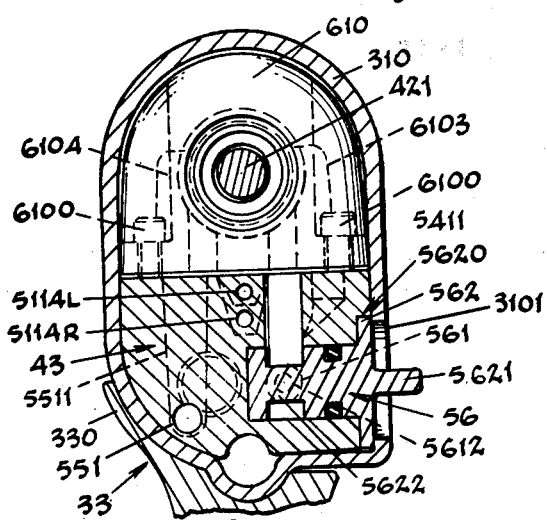
FIG. 21 illustrates a view of a vertical transverse section taken along the plane of the line 21—21 indicated in FIG. 19.
Figure 22:
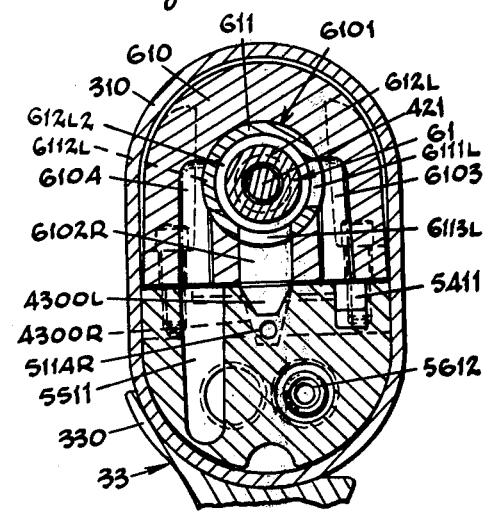
FIG. 22 is a view of vertical section taken along the plane of the line 22—22 indicated in FIG. 17.

I provide a means in the circuitry 50 by which the speed of the motor 40 may be controllably varied between a full "on" to full "off", while the motor is reciprocating. Such means, therefore, may also serve the function of a stop and start control and is embodied in a valve 56 disposed in passage 541 extending through the manifold 43. It and the thereto related parts are best shown in FIGS. 19 and 21 of the accompanying drawings. The valve 56 has a valve member 561, preferably biased, as by a spring 5610, to seat against its seat 5611 and thus close the otherwise free communication between the described pressure extension hose 543 and openings 5112L and 5112R in the just described shifter valve sleeve 511.

In order to operate and thus open the valve 56, I provide turn disc 562, suitably journaled, as at 5620, in the manifold header 43 for limited rotation about its discular axis. The turn disc has a fin 5621 which extends through an opening 3101 in the body part shell 310 and provides an operating handle and indicator for turning the disc 562. The turn disc 562 also has a radial cam 5622 on its inwardly projecting end. The cam 5622 is disposed to wipingly engage a stem 5612 on the inner side of the valve member 561. Thus, when the turn disc 562 is rotated in its journal 5620, the cam 5622 engaging the valve stem 5612 lifts the valve member 561, as a poppet, against the bias of the spring 5610 to some desired open position. By varying the cant of the fin 5621, the operator may vary the angle of valve displacement by the cam 5622 and the degree to which the valve member 561 is held open, as between full closed to full open.

By this provision, a user of a reciprocator embodying my invention may stop and start the motor 40 and, while the motor is reciprocating, may easily and quickly vary its speed to suit the requirements of the work.

The Pilot Circuitry 60

That the shifter valve 51 may be operated in synchronism with the motor 40, I provide pilot circuitry 60 that is designed to be triggered by the motor 40, particularly by the piston rod 421 as the motor moves from and toward each extreme of its reciprocatory stroke. The triggering means of such pilot circuitry is embodied in a valve 61 shown best in FIGS. 5, 17, 19, 20 and 22 of the accompanying drawings. The orientation of the valve 61 to the motor circuitry 50 and operation of the motor 40 may be quickly grasped from a consideration of the diagrammatics of FIGS. 23 to 26 inclusive.

The valve 61 is a compound valve housed, preferably, in a sub-assembly chassis 610 mounted on the manifold 43 and attached thereto by suitable bolts 6100. The chassis 610 has a central or core chamber 6101 that extends axially from one to the other end of the chassis and is purposed to receive (see FIG. 17 of the drawings) a valve sleeve 611 therein. Within the valve sleeve 611 are a pair of spool-type valve members 612L and 612R, each of which is axially and independently movable through limited distances within the sleeve 611. Provision is had by which each valve member may be caused to move individually, either to the left or right, as viewed in FIG. 5 of the accompanying drawings and diagrammatically illustrated in FIGS. 24 and 26 thereof.

The valve 61 is operatively connected to the shifter valve 51 by means of passageways 6102L and 6102R in the chassis 610. These passageways communicate with passageways 4300L and 4300R, respectively, within the manifold, and respectively with passageway 5114L, within the body part 311 and manifold 43 and passageway 5114R within the manifold. The passageway 5114L communicates with one end, the left end, as viewed in FIG. 5 of the drawings, of the shifter valve sleeve 511. The passageway 5114R communicates with the other end of the shifter valve sleeve. The valve member 510 has suitable end seals 5101 so that, when a fluid under pressure is directed from pilot valve 61 through passageways 6102L, 4300L and 5114L, the valve member will respond by moving to the right end of the valve sleeve 511, as viewed in FIG. 5 of the accompanying drawings. Conversely, when fluid under pressure is directed through passageways 6102R, 4300R and 5114R by pilot valve 61, the shifter valve member 510 will move, assuming the relief of the previously described circuit, to the left end of the valve sleeve 511. In so moving the shifter valve member 510 makes, breads, and re-establishes the heretofore described circuitry 50 by which the motor 40 is reciprocated.

In order to connect the pilot valve 61 to a source of fluid under pressure, the passageway 541 in the manifold 43 communicates with pilot passageway 6103, in the chassis 610, by way of passageway 5411 with the pilot valve chamber 6101. Likewise, that the pilot circuitry 60 may be relieved when such is required, the exhaust passageway 551 in the manifold 43 communicates through a pilot branch passageway 6104 in the chassis 610 with the pilot valve chamber 6101.

The connection and control by which pressured fluid is directed to and through either passageways 6102L or 6102R thus to move shifter valve 51 to positions at one or the other end of the shifter valve sleeve 511 is the function of the pilot valve members 612L and 612R. These valve members, shown in perspective section in FIG. 12 and as an exploded assembly in FIG. 13 of the accompanying drawings, are each an annular body, assembled upon, and being freely movable along an extension 4211 of the piston rod 421 and within the pilot valve sleeve 611. Preferably, a nylon spacer washer 613 is located between the pilot valve members 612L and 612R to cushion contact between the pilot valve members when the same occurs as will be explained and to provide space between the valve members to house a biasing means. such biasing means may be embodied in a spring 614, extending between the valve members 612L and 612R and preferably in telescopic relation to and being freely floatable along the piston rod extension 4211. One end of the spring 614 bears against the valve member 612L and the other end against the valve member 612R, biasing the valve members against movement toward each other and toward a predetermined spaced-apart relation. Such spaced-apart relation may be determined by stop rings 615L and 615R suitably set (see FIG. 5) in grooves 6110L and 6119R in the pilot valve sleeve 611. In such spaced-apart relation, the pilot circuit 60, controlled by pilot valve 61, will be open to pressure, thus to maintain the shifter valve 51 in one or the other of the extreme positions to which it may have been previously shifted.

This consequence results from the provisions within the pilot valve sleeve 611 and the valve members 612L and 612R now to be described. The sleeve 611 has (see FIG. 17) paired axially spaced openings 6111L and 6111R which are in communication with the passageway 6103 in the chassis 610 and a second pair of axially-spaced openings 6112L and 6112R which are axially spaced from the pair of openings 6111L and 6111R and in communication with chassis passageway 6104. The circuit of control of the shifter valve 51 also connects (see FIG. 5) through another pair of axially spaced openings 6113L and 6113R in the valve sleeve 611 and in communication with passageway 6102L in the chassis and a second pair of axially spaced openings 6114L and 6114R in the valve sleeve 611, each axially spaced from the other and from the pair of openings 6113L and 6113R and in communication with passageway 6102R in the chassis 610.

The valve members 612L and 612R have axially spaced pairs of axially spaced grooves, the valve member 612L having grooves 612L1 and 612L2 and the valve member 612R having grooves 612R1 and 612R2. The grooves are so spaced along each member and relative to sleeve openings, 6111L, 6111R; 6112L, 6112R; 6113L, 6113R and 6114L and 6114R that, when the members 612L and 612R are at rest, in normal positions against the stop rings 615L and 615R (see FIG. 5) to which they are biased by pilot valve spring 614, fluid under pressure will be communicated through chassis passageway 6103 and sleeve openings 6111R and 6111L; member groove 612L2 of member 612L and groove 612R1 of member 612R, and sleeve openings 6113R and 6114L, respectively, the passageways 6102L and 6102R leading to opposite sides of the shifter valve 51. The foregoing described circuit, shown diagrammatically in FIGS. 23 and 25 of the accompanying drawings, exerts a continuing, constantly recharged locking pressure circuit on the shifter valve 51, operating to retain it in whatever position it may be in, when such circuit is thus applied.

When movement of the shifter valve 51 is desired, as from the position shown in FIG. 5 and diagrammatically in FIG. 23 of the drawings, to a position shown diagrammatically in FIGS. 25 and 26 of the drawings, movement of the pilot valve member 612R will be required. Such required movement of valve member 612R is that which causes its groove 612R2 to now register with pilot sleeve openings 6112R and 6114R. One will immediately see that by such movement, the previous described open communication between passageways 6103 and 6102R by which fluid pressure was exerted on the right end of the shifter valve 51, as viewed in FIG. 5 of the drawings, is interrupted. Instead, such fluid pressure on the right-hand end of the shifter valve 51 will be relieved to exhaust or sump, allowing the pressure exerted on the left-hand end of the shifter valve 51 to manifest itself in an immediate rightward movement of the shifter valve.

Conversely, when movement of the shifter valve 51 is desired from the position diagrammatically illustrated in FIG. 25 of the drawings again to the position shown in FIG. 5 and diagrammatically in FIG. 23, a movement of the other pilot valve member 612L is necessary. This necessary movement is such that member 612L cause its groove 612L1 to now register with sleeve openings 6112L and 6113L. This movement to effect the described registration breaks the previously described open communication between passageways 6103 and 6102L through which pressure fluid had been previously exerted on the left (as viewed in FIG. 5 of the drawings) end of the shifter valve 51. In place, the left end of the shifter valve 51 connects with exhaust or sump. The relief, on the left-hand end of the valve 51, allows the fluid pressure exerted on right end of the shifter valve 51 to instantly effect leftward movement of the shifter valve, returning to the position shown in FIG. 5.

That the movement of the members 612L and 612R from their at-rest positions, against the stop rings 615L and 615R, will be synchronous with the movement of the motor piston 42, thus to shift valve 51 in proper sequence to the change in direction of reciprocatory movement of the motor piston, means, now to be described, associated with the piston rod 421 and the extension 4211 thereof is provided. Such means is preferably embodied, on the one hand, in a radially outward extending annular shoulder 4212, formed on the piston rod extension 4211, and a therewith mating axially extending annular socket 612L3, formed in the left end (as viewed in FIG. 5 of the drawings) of member 612L. The socket 612L3 nests with and surrounds the piston rod extension 4211 and the shoulder 4212 thereon. The shoulder 4212 is formed axially on the piston rod extension so that it enters the socket 612L3, engaging and moving the member 612L while the piston 42 is completing the rightward moving leg of its reciprocatory stroke, as viewed in FIG. 5 of the accompanying drawings. This consequence is diagrammatically illustrated in FIG. 26 of the drawings.

The means for moving the other member 612R is likewise associated with the piston rod extension 4211. In addition thereto, the member 612R moving means ia adjustable along the piston rod extension to vary the moment, in the movement of the piston rod extension 4211, at which moving engagement of the member 612R is to occur. The consequence of such adjustment will be to vary the moment in the movement of the motor piston at which the shifter valve 51 is shifted and thus the motor piston 42 is reversed. Thus, the length of the stroke of the motor piston may be varied within the limits of full to a lesser but something greater than zero stroke. Such last named member engaging means, preferably, is embodied in a traveler nut 616 threadably engaging a threaded portion 4213 of the piston rod extension 4211. The traveler nut 616 has an end nose 6160 adapted to engage the member 612R, preferably, an inwardly extending annular shoulder 612R3 thereof, when the piston 42 moves leftwardly, as viewed in FIG. 5 of the accompanying drawings. Such engagement may be made to occur early or late in the piston leftward movement, by turning the traveler nut 616 on the threaded portion 4213, forward to effect early engagement and shortened storke or rearward to obtain later engagement and lengthened storke of the piston 42.

That such adjusting movement of the traveler nut along the piston rod extension 4211 may be accomplished while the motor 40 is operating and from points exterior of and without dismantling the housing 30 or the piston 42, the traveler nut 616 has a head 6161 whose lateral surface 6162 may have opposite flatted areas 6163, extending parallel to the axis of the piston rod extension 4211 and to the path of movement thereof as it reciprocates with the piston 42. A knob 617, having a journal portion 6170 preferably mounted for rotation in an opening 3102 in the housing shell part 310, provides a means for effecting adjusting movement of the traveler nut 616. The opening 3102 centers about an axial projection of the piston rod extension 4211 and thus locates the knob 617 in spaced but aligned relation with the right end of such extension 4211. The knob 617 preferably has an exteriorly knurled head 6171 which encloses a chamber 6172. The chamber 6172 opens inwardly to the interior of the shell 310 between opposite and somewhat extended knob bifurcations 6173.

During the assembly of a reciprocator embodying my invention, the traveler nut 616 and the knob 617 are coordinated that the nut 616, particularly its head 6161, is disposed between the bifurcations 6173 and so that the flatted areas 6163 of the traveler head slidably engage and thus mesh with inner surfaces 6174 of the knob bifurcations. Those skilled in the art will recognize, in this relation and structure, a kind of slide coupling in which the knob 617, when turned, may transmit torque to the traveler nut 616, without restraining the axial (and reciprocative) movement of the traveler as an incident of reciprocation of the traveler supporting piston rod extension 4211 or of the thread induced movement of the traveler along the extension, in response to rotation of the knob 617.

The Tool Engaging Means 70

The means 70 for engaging a tool in a reciprocator embodying my invention is best shown in FIGS. 5, 10, 11, 12 and 15 of the accompanying drawings. The components of such means 70 are housed, for the most part, in the barrel nose 32 of the housing 30. Normally adapted to allow the tool, though being reciprocated, to rotatively float about its axis of reciprocation, the means 70 includes elements by which rotative float of the tool may be controllably interrupted during tool reciprocation. It is primarily in this provision that one important aspect of my invention resides.

The barrel nose part 32 of the housing is bored near its outer, left-hand end, as viewed in FIG. 5 of the accompanying drawings, to provide a cylindrical surface 320 of dimensions to receive a sleeve-like slide bearing 71 in press fit therewith. The bearing 71 provides support, while allowing reciprocation and rotation of a tool chuck 72.

The tool chuck 72 is largely conventional to the art, having an exterior shell 720, whose outer cylindrical surface 7200 slidably engages journal surface 710 of the bearing 71 to support the shell for reciprocation and rotation relative to the barrel nose part 32. Within the shell 720, an internal threaded portion 7201 thereof threadably engages a like threaded portion 7210 of a chuck mandrel 721. The mandrel 721 has suitable means, as in a radial thrust type coupling 7211, shown best in FIGS. 5 and 11 of the accompanying drawings, for connecting the chuck 72 to the piston rod 420.

Figure 11:
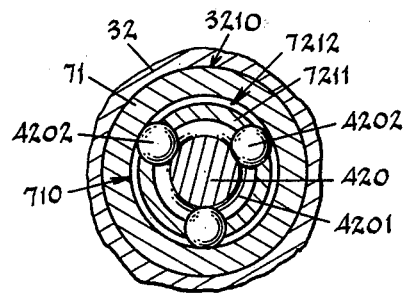
FIG. 11 is a view of a vertical transverse section taken along the plane of the line 11—11 indicated in FIG. 5.
Figure 17:
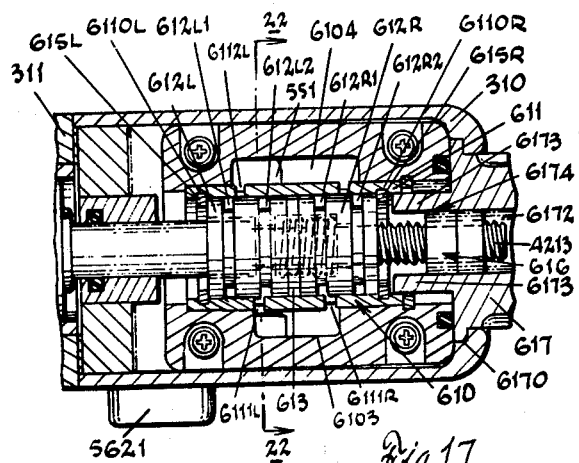
FIG. 17 illustrates a view of a horizontal section taken on the plane of the line 17—17 indicated in FIG. 1.
Figure 18:
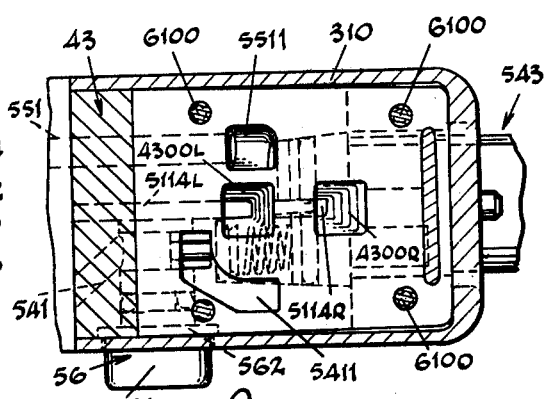
FIG. 18 in a view of a portion of a horizontal section taken on the plane of the line 18—18 indicated in FIG. 6.

One end of the piston rod 420 preferably has a necked portion 4201 that is dimensioned to be axially insertable into one end of the mandrel 721 and there register with a race groove 7212 formed interior thereof. The necked portion 4201 of the piston rod and the groove 7212, when in mutual registry, are adapted to receive and provide a race for a plurality of ball bearings 4202, as shown in FIG. 11 of the drawings. Thus, completing the split bearing coupling 7211 and connecting the mandrel 721 and piston rod 420 in a manner that endwise axial movement of the piston rod will be transmitted to the mandrel, without restricting the freedom of the mandrel 721 to rotate independently of the piston rod 420.

The mandrel 721 also has a cleft end 7213, forming tool engaging jaws 7214. As the mandrel and chuck shell 720 are rotated relative to each other on threaded portions 7201 and 7210, the jaws 7214 engage convergent surfaces 7202 on and within the shell 720 and are thereby moved radially inward to seize upon the shank of any tool extending into the chuck 72, all in a manner well known in the art. Of course, relative rotation and axial movement of the shell and mandrel in the opposite direction allows the jaws 7214 to move radially outward and release such previously seized tool shank.

That the freedom of the chuck 72 to float rotatively relative to the housing 30 may be controllably interrupted, I provide trigger-operated means on the housing 30 to engage the chuck shell 720 and restrict the same against rotation without hinder to its continued reciprocation. Such means, shown best in FIGS. 5, 10 and 15 of the accompanying drawings, preferably includes a lock pin 73 mounted for plunger movement in spaced bearing portions 321 and 322, within the barrel nose 32. The lock pin 73 may be suitably biased, as by spring 730, against inward movement and so as to normally rest against a latch arm 7310 of a trigger 731. The trigger 731 may be pivotally supported, as by pin 7311, on a pair of spaced flange guards 3113 projecting laterally and downwardly from the housing at an approximate point at which the housing body part 311 merges with the barrel nose part 32. This places the trigger 731 in a favorable relation to the handle 33 and so that an operator, having the handle in grip, by finger squeezing the trigger, particularly the saddle 7312 thereof, may actuate the locking pin 73 to move inwardly. Release of the trigger 731, of course, allows the spring 730 to move the pin 73 outwardly.

As the locking pin 73 is thus moved inwardly, its inner end 732, guided by bearing 321, engages between axially projecting teeth 7110 of a ratchet 711, best shown in FIGS. 5, 10 and 15 of the drawings. The ratchet 711 is preferably mounted to move rotatably with the mandrel 721. There is provision, however, in the radial extending teeth 7112 of the ratchet 711 that engage in and move along splines 7215 extending axially along the mandrel 721 that while resisting rotatable movement of the ratchet 711 relative to the mandrel 721 allows reciprocation of the mandrel relative to the ratchet. When the teeth 7110, in the course of rotation of the mandrel 721, relative to the housing 30, come to a position at which a land space 7111 between adjoining teeth 7110 registers with the locking pin 73, the pin may be activated to insert its inner end 732 between the teeth 7110 and, for so long as it thus remains, the freedom of the mandrel 721 to rotatively float relative to the housing 30 will be restricted without, however, interfering with its continued reciprocation relative to the housing in response to the movement of the piston 42.

Operations

In the preceding description of certain parts and combinations, individual operation of such has been often described or, to the skilled in the art, became apparent. It is now my purpose to combine such descriptions, some times by reference and at other times more in detail, to provide an outline of a full program of the performance and use of a reciprocator embodying my invention. It will be assumed that a source of fluid under pressure is available, preferably pressured air, although a reciprocator embodying my invention will be responsive to a pressured hydraulic medium. I have found that, in actual use of pressured air in a physical embodiment of a reciprocator incorporating my invention, the source need not be capable of delivering very much more than 90 cubic feet per hour to obtain the full range of reciprocator performance.

It is also to be assumed that there will be some suitable sump or exhaust remote from the work site. It is contemplated, especially when pressured air is to be used to operate the motor 40, that spent air shall be discharged at a place remote from the work to thus be diverted from generating an occupationally unhealthy atmospheric suspension of work detritus in the vicinity of the reciprocator and the operator thereof. Such consideration is becoming of greater concern in the maintenance of the health and welfare of the operator.

In order, therefore, that the pressured fluid from the mentioned source and the spent fluid from the reciprocator may be conducted to and from the reciprocator and the reciprocator be easily portable at the work site, the hose 543 is first connected respectively to source and exhaust of such fluid.

The operator selects the tool: a file cutter, stone, leather or the like, to be reciprocated, and through manipulation of the chuck shell 720, relative to the chuck mandrel 721, which may be held against rotation by operation of the trigger actuated pin 73, and in a manner well known in the art, opens the chuck jaws 7214, inserts the shank of the selected tool within the chuck and between the jaws. Now, by reverse manipulation of the chuck shell, the tool is locked in the reciprocator. It will be remarked by those skilled in the art that the hand-gun relation of the handle 33 and the housing nose barrel portion 32 facilitates the accomplishment of the just described tool placement regimen.

Being prepared to begin work, the motor 40 is started by turning the control disc 562 of the valve 56. Fluid under pressure, brought to the reciprocator housing 30 from a source of the same by the hose 543, enters into the components of the motor activating and pilot circuitries 50 and 60. Turning once more to the diagrammatics shown in FIGS. 23 to 26 inclusive of the drawings and assuming the motor piston 42, at the moment of operating the starting valve 56, to be in the position shown in FIG. 23, it will be seen that the piston is postured to continue a leftward movement as viewed in the drawing. This, I indicate by the arrow 4223.

The shifter valve member 510 will then be at the left end (as viewed in FIG. 23) of the valve sleeve 511, thereby connecting the right end of cylinder 41 with pressured fluid through the valve 51 and passage 53. I indicate this, in FIG. 23, by arrow 4123P. At the same time, spent fluid will exit from cylinder 41 through passage 52 and shifter valve 51 to exhaust. This I have indicated by arrow 4123X in FIG. 23. The pilot circuitry 60 is effectual at this time to retain the shifter valve member 510 in a leftward position shown in the drawing. This is so because the valve members 612L and 612R are at their normal at-rest positions under the urgence of spring 614. Thus, the pilot circuits are entirely under the influence of pressured fluid exerted through passageways including 5114L and 5114R. This, I indicate by suitable arrows 5123 in FIG. 23.

The piston 42 continues to move in the direction suggested by arrow 4223 approaching one end of its stroke. This is diagrammatically illustrated in FIG. 24. At this stage, the traveler nut 616 engages and moves the valve member 612R leftwardly, as viewed in the drawing. Such movement of the valve member 612R opens the previously established pressure circuit exerted on the right end of shifter valve member 510, through passageway including 6102R and connects the same with exhaust or sump. I indicate this in FIG. 24 of the drawings by the broken arrow 5124. In response to such change in the pilot circuitry 60, the shifter valve member 510, because of the condition of pressured fluid then being exerted on the valve member 510 through the passageway 5114L, immediately moves to the right end of its stroke, a position indicated in FIG. 25 of the accompanying drawings.

Now pressured fluid is introduced into the passage 52 to the left side of the piston 42, indicated by arrow 4125P in FIG. 25. This causes the piston to move, as shown in FIG. 25, in the direction of arrow 4225. Spent fluid from the right end of the cylinder 41 exits through passageways including 53, all as is indicated by arrow 4125X in FIG. 25. As in the condition illustrated in and described with reference to FIG. 23, the pilot valve member 612R following reversal of the shifter valve member 510 and resultant reverse movement of the piston 42 is disengaged by the traveler nut 616 and returns to its normal at-rest position, causing pilot pressured fluid to be again exerted on both ends of the shifter valve member 510. These pressures, I indicate in FIG. 25 by arrows 5125, tend to hold the valve member 510 against movement until such movement is required as dictated by movement of the piston 42.

The piston 42 continues now rightwardly as shown in FIG. 25 and approaches the position shown diagrammatically in FIG. 26. This corresponds with the position of the parts as also shown in FIG. 5 of the accompanying drawings. As the piston approaches this end of its stroke, shoulder 4212 on the piston rod extension 4211 engages in the socket 612L3 of valve member 612L and moves the same from its normal at-rest position against the bias of spring 614, rightwardly as viewed in FIG. 26. This movement of member 612L opens the already described pressure circuit exerted on the left end of shifter valve member 510 through passageways including that indicated 5114L and connects the same with exhaust. The broken arrow 5126 in FIG. 26 is selected to illustrate this condition.

At this moment, due to the just described change in the pilot circuitry 60, the shifter valve member 510, because of the condition of pressured fluid then being exerted on the valve member 510 through the passageway 5114R, immediately moves to the left end of its stroke. This re-establishes conditions in the circuitry 50 described in connection with FIG. 23, to again start moving the piston 42 to the left. As before, in the first stages of reversed movement of the piston 42, the pilot valve member 612L is disengaged by the shoulder 4212 and returns to its normal at-rest position. This re-establishes pilot pressures to be again exerted on opposite ends of the shifter valve member 510, as indicated by arrows 5123 in FIG. 23 of the accompanying drawings. Such counteractive pressures tend to hold the valve member 510 against movement until such movement is required as dictated by movement of the piston 42.

Desired speed changes in the reciprocation of the tool, for example, in the physical embodiment I have constructed of my invention, ranging up to 12,500 per minute, may be obtained easily and quickly through manipulation of the control disc 562 of valve 56 which increases or decreases the quantity of pressured air allowed, per unit of time, to enter the circuitries 50 and 60 and by manipulation of the knob 617 to produce through shortened and lengthened strokes an increased or decreased number of strokes per unit of time.

It is believed already apparent to those skilled in the art that angular movement of the disc 562 one may vary the degree of openness or closeness of the valve member 561 to adjust the allowable inflow of the pressured drive medium. When, however, greater speeds are required then obtainable solely by variation of input of pressured medium, or when a stroke of a lesser dimension is desired, the operator by turning knob 617 causes, through its coupling with the traveler nut 616, movement of such traveler nut 616 along the threaded portion 4213 on the piston rod extension 4211. When, by rotation of knob 617, the traveler nut is located more proximate the piston 42, the nose 6160 of such traveler nut will engage the shoulder 612R3 of the valve member 612R earlier in the course of piston movement. Thus, actuation, as previously described, of the valve member 612R to cause a shift of the valve member 510 will occur earlier in the stroke of piston 42 as will reversal of flow to cylinder 41. Hence, the stroke of the piston 42 at one end will be foreshortened and the strokes per unit of time increased.

On the other hand, should it be desired to decrease the strokes per unit of time or to increase the dimension of the stroke itself, rotation of the knob 617 in the opposite direction will cause the traveler nut 616 to move along the piston rod extension 4211 away from the piston 42 with corresponding later engagement of the member 612R and an expected fewer strokes of greater dimension per unit of time.

That the freedom of the chucked tool to rotatably float, an advantage in certain circumstances of tool use, may be controllably interrupted, the operator need merely gently squeeze the trigger 731. Such action projects the lock pin end 732 between the spline-like teeth 7110 of the ratchet gear 711 on the mandrel, locking the mandrel, and thus the tool held thereby, against further free rotative movements. By release of the trigger 731, the spring 730 causes the lock pin 73 to disengage the ratchet, freeing the mandrel for a resumption of rotative float.

In the aforementioned physical embodiment of my invention which I have constructed, the reciprocator, with the handle 33 attached, weighs 17.5 ounces, being 1 7/16 inches thick, 6 ¼ inches long and 5 inches high. In operation, it has the potential of acting through a stroke that may vary from a 1/16 inch stroke to a ⅜ inch stroke, at speeds that are variable from 12,500 strokes per minute to 8,500 strokes per minute, respectively. Vibration is acceptable as indicated by its demonstrated generation of less than 90 decibels at highest speed operation. The reciprocator consumes 1.8 cubic feet of pressured air per minute, operating efficiently when such is under a pressure of at least 50 to not greater than 125 pounds per inch.

It will be remarked by those skilled in the art that changes in speed, in stroke dimension and in free float relation obtainable, by the provisions of my invention, while the reciprocator and tool reciprocated thereby are in operation, quickly and easily, and without reorganization of the reciprocator or the addition of supplementary parts, as is common to the art, are of great advantage and value to the user.

I claim:

1. In a tool reciprocator for operation with a source of pressured fluid and a sump, the tool reciprocator having a housing; a fluid-operated reciprocatory motor having cylinder and piston elements on the housing; a pair of motor conduits in communication with spaced points in the motor cylinder element on opposite sides of the motor piston element and with the sump and source of pressured fluid; a pressured fluid responsive and operated movable shifter valve member common to the motor conduits and disposed therein between the motor cylinder element and source of pressured fluid and sump adapted, when moved to and occupying one position, to connect a motor conduit, communicating with the motor cylinder element on one side of the motor piston element, with the source of pressured fluid and the other motor conduit, communicating with the motor cylinder element on the other side of the motor piston element, with the sump and, when moved to and occupying another position, to connect the first mentioned motor conduit with the sump and the second mentioned motor conduit with the source of pressured fluid and thereby to reciprocate one of the motor elements; a tool engaging part operatively connected to the reciprocative of the motor elements and adapted to be reciprocated thereby; and means for moving the movable shifter valve member to and from the mentioned positions thereof comprising:

a pilot conduit individual to and operatively connected with one end of the mentioned movable shifter valve member and to the source of pressured fluid and to the sump for communicating pressured fluid and for venting spent pressured fluid to and from the mentioned movable shifter valve member end;

a second pilot conduit individual to and operatively connected with the other end of the movable shifter valve member, opposite to the first mentioned shifter valve member end, and to the source of pressured fluid and to the sump for communicating pressured fluid and for venting spent pressured fluid to and from the second mentioned movable valve shifter member end;

a pilot valve member individual to and disposed in the first mentioned pilot conduit between the source of pressured fluid and the sump and the first mentioned end of the movable shifter valve member and supported for movement to and from a first position in closed relation to the sump and open relation to the source of pressured fluid from and to a second position in open relation to the sump and closed relation to the source of pressured fluid and providing, when in the first mentioned position, communication between the source of pressured fluid and the first mentioned end of the movable shifter valve member and, when in the second mentioned position, communication between the sump and the first mentioned end of the movable shifter valve member;

a second pilot valve member individual to and disposed in the second mentioned pilot conduit between the source of pressured fluid and the sump and the second mentioned end of the movable shifter valve member and supported for movement to and from a first position in closed relation to the sump and open relation to the source of pressured fluid from and to a second position in open relation to the sump and closed relation to the source of pressured fluid and providing, when in the first mentioned position, communication between the source of pressured fluid and the second mentioned end of the movable shifter valve member and, when in the second mentioned position, communication between the sump and the second mentioned end of the movable shifter valve member;

means in engagement with the mentioned pilot valve members and operative to bias each of the same to normally occupy the pilot valve member first mentioned position, whereby pressured fluid is normally communicated to and exerts against both ends of the mentioned opposite ends of the movable shifter valve member at the same time; and means operatively connected to and actuated by the reciprocative of the motor elements to individually and selectively move one of the pilot valve members from its respective first mentioned position to the second mentioned position thereof, when the reciprocative of the motor elements approaches a certain stage in a stroke thereof, whereby the movable shifter valve member responds to the pressured fluid being communicated and exerted on the end of the mentioned opposite ends of the movable shifter valve member through the pilot conduit in which the unmoved pilot valve member is located causing the movable shifter valve member to move from an occupied to an unoccupied position of the mentioned positions thereof with alacrity and substantially coincidentally with the arrival of the reciprocative of the motor elements at the mentioned stage in its stroke and thus to speedily reverse the direction of movement of the reciprocative of the motor elements.

2. In a tool reciprocator for operation with a source of pressured fluid and a sump, the tool reciprocator having a housing; a fluid-operated reciprocatory motor having cylinder and piston elements on the housing; a pair of motor conduits in communication with spaced points in the motor cylinder element on opposite sides of the motor piston element and with the sump and source of pressured fluid; a pressured fluid responsive and operated movable shifter valve member common to the motor conduits and disposed therein between the motor cylinder element and source of pressured fluid and sump adapted, when moved to and occupying one position, to connect a motor conduit, communicating with the motor cylinder element on one side of the motor piston element, with the source of pressured fluid and the other motor conduit, communicating with the motor cylinder element on the other side of the motor piston element, with the sump and, when moved to and occupying another position, to connect the first mentioned motor conduit with the sump and the second mentioned motor conduit with the source of pressured fluid and thereby to reciprocate one of the motor elements; a tool engaging part operatively connected to the reciprocative of the motor elements and adapted to be reciprocated thereby; the provision of means for moving the movable shifter valve member to and from the mentioned positions thereof including:

a pilot conduit individual to and operatively connected with one of the opposite ends of the movable shifter valve member and to the source of pressured fluid and to the sump for communicating pressured fluid and for venting spent pressured fluid to and from said one end of the opposite ends of the movable shifter valve member;

a second pilot conduit individual to and operatively connected with the other of the opposite ends of the movable shifter valve member and to the source of pressured fluid and to the sump for communicating pressured fluid and for venting spent pressured fluid to and from said other end of the opposite ends of the movable shifter valve member;

a pilot valve having a first movable valve member individual to and disposed in the first mentioned pilot conduit(s) between the source of pressured fluid and the sump and (one end of) the first mentioned end of the opposite ends of the movable shifter valve member(,) and (each pilot valve having a movable pilot valve member) being (positioned) normally in a position of a closed relation to the sump and of an (normally in) open relation to the source of pressured fluid and providing communication thereof to (that) the first mentioned end of the mentioned opposite ends of the movable shifter valve member; (connected to the pilot conduit in which such pilot valve is disposed)

said pilot valve having a second movable valve member individual to and disposed in the second mentioned pilot conduit between the source of pressured fluid and the sump and second mentioned end of the mentioned opposite ends of the movable shifter valve member and being normally in a position of a closed relation to the sump and of an open relation to the source of pressured fluid and providing communication thereof to the second mentioned end of the mentioned opposite ends of the movable shifter valve member whereby (pressured fluid normally exerts against) both ends of the mentioned opposite ends of the movable shifter valve member are normally in communication with the source of pressured fluid at the same time;

a part;

and means operatively connected to the part and to the reciprocative of the motor elements adapted, during an approach of the reciprocative of the motor elements to a stage in a stroke thereof, to move the part to operatively engage one of the mentioned pilot valve members and move the engaged pilot valve member to close communication through the pilot (valve associated with) conduit in which the engaged pilot valve member is located with the source of pressured fluid and open communication therethrough with the sump, whereby the movable shifter valve member responds to the pressured fluid being already communicated from the source of pressured fluid and exerted on the end of the mentioned opposite ends of the movable shifter valve member through the pilot conduit in which the unengaged pilot valve member is located and the movable shifter valve member is moved from an occupied to an unoccupied position of the mentioned positions thereof with alacrity and substantially coincidentally with the arrival of the reciprocative of the motor elements at the mentioned stage in its stroke to speedily reverse the direction of movement of the reciprocative of the motor elements.

3. In a tool reciprocator, as described in claim 2, having in addition thereto:

a second part in spaced relation to the first mentioned part operatively connected to the reciprocative of the motor elements and movable therewith and adapted, during an approach of the reciprocative of the motor elements to another stage in a stroke thereof spaced from the first mentioned stage, to operatively engage the (other of the) second mentioned pilot valve member(s) and move the same to close communication therethrough with the source of pressured fluid and open communication therethrough with the sump, whereby the movable shifter valve member may be rapidly reciprocated to cause a correspondingly high speed reciprocation of the reciprocative of the motor elements and such tool as may be being reciprocated thereby.

4. In a tool reciprocator, as described in claim 2, having in addition thereto:

resilient means in bearing relation on one of the mentioned pilot valve members, yieldingly resistant to movement thereof induced through the mentioned engagement thereof by the mentioned part and operative upon disengagement with the mentioned part to return the pilot valve member engaged by the mentioned resilient means to its normal position, whereby pressured fluid is again exerted simultaneously on both of the mentioned opposite ends of the movable shifter valve member.

5. In a tool reciprocator, as described in claim 4, in which the mentioned resilient means is in bearing relation on each of the mentioned pilot valve members, whereby movement of the pilot valve members from their respective normal positions will be yieldingly resisted.

6. In a tool reciprocator, as described in claim 5, in which the mentioned resilient means is a spring disposed within the housing with each end of the opposite ends of the spring being operatively connected to one of the pilot valve members.

7. In a tool reciprocator, as described in claim 2, in which
the part operatively connecting means is adjustable relative to the reciprocative of the motor elements,
whereby the stage in the stroke of the reciprocative of the motor elements at which the part engages a pilot valve member may be selectively advanced and withdrawn relative to such stroke.

8. In a tool reciprocator, as described in claim 2, in which
the part operatively connecting means includes a threaded rod operatively connected to the reciprocative of the motor elements and extending axially along a line parallel to the axis of reciprocation of the reciprocative of the motor elements adapted to threadably engage the part for to and fro movement of the part along the rod; and
a unit journaled on the housing in a plane normal to the axis of reciprocatory movement of the rod and near one end of the stroke thereof adapted to engage the part, notwithstanding movement of the part and rod relative to the housing and, on rotation of the unit, to move the part axially relative to the rod,
whereby the part may be adjusted along the rod to selectively advance and withdraw the stage in the stroke of the reciprocative motor element at which the part engages a pilot valve member while the reciprocative of the motor elements moves reciprocatorily.

9. In a tool reciprocator, as described in claim 8, in which
the unit has a protruding portion, and the housing has an opening through which the unit protruding portion extends,
whereby the unit is accessible exterior of the housing for rotative movement relative thereto to adjustably position the part along the rod.

10. In a tool reciprocator, as described in claim 8, in which
the part has a substantially flat surface extending in a plane parallel and tangent to the axis of reciprocation of the reciprocative motor element and
the unit has a projection in proximating sliding contact with the part flat surface adapted, when the unit is rotated relative to the housing, to engage the part flat surface and transmit part rotating torque about the threaded rod notwithstanding reciprocation of the part supporting rod
whereby the part may be caused to threadably move along the rod while the reciprocative of the motor elements continues to reciprocate.

11. In a tool reciprocator, as described in claim 10, in which
the unit projection flat surface extends in a plane tangent and parallel to the axis of reciprocatory movement of the rod and of a dimension along a line parallel to such axis substantially equal to the length of the longest stroke of which the rod is capable of making in response to the reciprocation of the reciprocative of the motor elements,
whereby the unit projection flat surface has a potential of sliding and torque transmitting contact with the part through a range of various part positions along the rod.

12. In a tool reciprocator, as described in claim 10, in which
the unit has a second projection extending from the unit in the same direction as and parallel to the prior mentioned projection and in spaced relation thereto of a dimension to receive and slidably engage the part there between,
whereby rotation of the unit in either direction will cause torque to be transmitted to the part and movement thereof forward and back along the rod.

13. In a tool reciprocator, as described in claim 12, in which
the part has a second flat surface extending parallel to and opposite the prior mentioned flat surface whereby the mentioned second projection may slidably engage the part.

14. In a tool reciprocator, as described in claim 13, in which
the unit second projection has a flat surface extending parallel to the prior mentioned unit projection flat surface,
whereby the flat surfaces of both unit projections approximate and engage in sliding engagement with the flat surfaces of the part in a bridle-like fit insuring smooth transmission of part moving torque to the part upon rotation of the unit in either direction.

15. In a tool reciprocator, as described in claim 2, in which the tool engaging part operative connection to the reciprocative of the motor elements includes:
a radial thrust type coupling adapted to support the tool engaging part for reciprocation with the reciprocative of the motor elements and for free rotation about the central longitudinal axis of reciprocation of the reciprocative of the motor elements and
means on and in movable engagement with the housing and adapted to be moved to engage the tool engaging part and restrain the same exclusively against rotation,
whereby the freedom of the tool to rotatably float may be interrupted during and while the tool is being reciprocated.

16. In a tool reciprocator, as described in claim 15, in which the last-named means includes:
a biasing component within and in engagement with the housing and adapted to yielding resist movement of the last-named means to engage the tool engaging part and operative to actuate the last-named means to disengage the tool engaging part.

17. In a tool reciprocator, as described in claim 16, in which the last-named includes:
a component exterior of and mounted for movement on the housing adapted to be manually activated against the urge of the biasing component to move the other components of the last-named means to engage the tool engaging part as aforesaid.

18. In a tool reciprocator, as described in claim 15, in which the last-named means includes:
a locking pin;
slide bearings on and within the housing and adapted to support the locking pin for plunging movement relative to the housing;
a spring in engagement with the locking pin and adapted to bias the same against plunging movement in one direction;
a trigger pivotally mounted on and exterior of the housing in bearing engagement with and on one end of the locking pin and adapted on manual activation to cause the locking pin to move against the bias of the spring;

a ratchet unit;

the ratchet unit and tool engaging part having mutually engaging spline surfaces whereby the tool engaging part and ratchet are restricted against relative rotation and are free for axial movement relative to each other;

the ratchet unit having a plurality of teeth arcuately and dimensionally spaced to allow the locking pin to enter therebetween when the same is moved by the trigger against the bias of the spring thus to lock the tool engaging part against relative to the housing.

* * * * *